(12) United States Patent
Ueda et al.

(10) Patent No.: US 6,525,649 B1
(45) Date of Patent: Feb. 25, 2003

(54) NON-CONTACT COMMUNICATION SYSTEM AND INTERROGATOR USED THEREFOR

(75) Inventors: Takashi Ueda, Kyoto (JP); Masanori Fujisawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/308,243

(22) PCT Filed: Dec. 8, 1997

(86) PCT No.: PCT/JP97/04504

§ 371 (c)(1),
(2), (4) Date: May 21, 1999

(87) PCT Pub. No.: WO98/26369

PCT Pub. Date: Jun. 18, 1998

(30) Foreign Application Priority Data

Dec. 10, 1996 (JP) .............................................. 8-330049

(51) Int. Cl.[7] .................................................. H04Q 5/22
(52) U.S. Cl. ............................... 340/10.34; 340/10.34; 340/572.1; 340/825.49; 340/10.1; 340/10.41; 340/10.3; 340/10.4
(58) Field of Search .......................... 340/10.34, 572.1, 340/825.56, 825.49, 10.1, 10.41, 10.3, 10.31, 10.4

(56) References Cited

U.S. PATENT DOCUMENTS

| 5,499,397 A | 3/1996 | Wadin et al. |
| 5,862,174 A | * 1/1999 | Yokota et al. |
| 5,864,302 A | * 1/1999 | Kokubu et al. ........ 340/825.54 |

FOREIGN PATENT DOCUMENTS

| EP | 0 693 695 A1 | 1/1996 |
| GB | 2152335 | * 7/1985 |
| JP | 63-246039 | 10/1988 |
| JP | 8-167012 | 6/1996 |
| WO | WO98/26369 | 6/1998 |

* cited by examiner

Primary Examiner—Michael Horabik
Assistant Examiner—Vernal U. Brown
(74) Attorney, Agent, or Firm—Arent Fox Kintner Plotkin & Kahn

(57) ABSTRACT

A non-contact communication system and an interrogator used therein achieve communication of information with a responsor, regardless of whether the responsor adopts a signal superimposition system or a signal separation system. The communication system includes first and second carrier supply portions (24, 28), first and second carrier modulation portions (25, 29), first and second carrier output portions (41, 42), first and second carrier detection portions (26, 35) and a control portion (50) using response information from the responsor to identify a system adopted by the responsor so that information is transmitted in a form matched to the identified system.

6 Claims, 5 Drawing Sheets

NON-CONTACT COMMUNICATION SYSTEM AND INTERROGATOR USED THEREFOR

FIELD OF THE ART

The present invention relates to non-contact communication systems provided with an interrogator and a responsor generating power from a radio frequency signal transmitted from the interrogator and transmitting, to the interrogator, information as a response to information obtained from a modified signal received from the interrogator, and interrogators used in the same.

BACKGROUND ART

Conventionally a radio frequency (RF) tag which obtains power from electronic waves transmitted from an antenna to transmit information internally stored has been devised and used in operation e.g. of ski lifts, train ticket gates, freight sorting, and the like. The RF tag is provided in the form of a non-contact card which has a non-volatile memory and an information transmitting and receiving scheme and is not provided with power supply, such as a battery. The non-contact card obtains power to consume from a received electronic wave (a radio frequency signal). Thus the card is not required to incorporate a battery therein and is thus capable of long-term exchange of information. The non-contact card also communicates information via electronic waves and is thus capable of non-contact communication of information.

At present in such a non-contact communication system there are two systems, i.e., signal superimposition system and signal separation system. Signal superimposition system provides data (information) communication and the power-supply to a non-contact card via a signal having a single frequency and thus only requires a single antenna at least for the non-contact card. By contrast, signal separation system provides data communication and power supply via signals having different frequencies and thus requires two antennas for a non-contact card. In addition to such different systems as signal superimposition system and signal separation system, there are various modulation systems, such as amplitude modulation, phase modulation. Thus between communication systems having different systems their respective non-contact cards or interrogators cannot be used mutually.

DISCLOSURE OF THE INVENTION

The present invention contemplates an interrogator capable of accommodating both of signal superimposition system and signal separation system, and a non-contact communication system including the interrogator.

One object of the present invention is achieved by providing an interrogator transmitting interrogation data to a responsor converting a received electronic wave into power and receiving response data from the responsor, including a first modulation circuit modulating according to interrogation data a first signal having a first frequency, a first transmission circuit transmitting to the responsor a signal modulated by the first modulation circuit, a second modulation circuit modulating according to interrogation data a second signal having a second frequency, a second transmission circuit transmitting to the responsor a signal modulated by the second modulation circuit, a reception circuit receiving a signal modulated by the responsor according to response data, and a select circuit selectively activating any one of the first and second modulation circuits in response to a signal received at the reception circuit.

An object of the present invention in another aspect is achieved by providing an interrogator including a first transmission circuit transmitting a first signal having a first frequency for supplying power and interrogation gate to a responsor, a second transmission circuit transmitting to the responsor a second signal having the first frequency for supplying power to the responsor and a third signal having a second frequency and modulated according to interrogation data, and a select circuit selectively activating any one of the first and second transmission circuits according to response data transmitted from the responsor.

An object of the present invention in still another aspect is achieved by providing a non-contact communication system provided with an interrogator and a responsor receiving an electronic wave transmitted from the interrogator to generate power and transmitting, to the interrogator, response data to data transmitted from the interrogator, the interrogator including a first transmission circuit transmitting a first signal having a first frequency for supplying power and data to the responsor, a second transmission circuit transmitting a second signal having the first frequency for supplying power to the responsor and a third signal having a second frequency for supplying data to the responsor, and a select circuit selectively activating any one of the first and second transmission circuits according to response data transmitted from the responsor.

Thus the present invention can advantageously provide an interrogator capable of communicating information and a non-contact communication system including the interrogator, whether the system adopted by a responsor is signal superimposition system or signal separation system.

BEST MODE FOR CARRYING OUT THE INVENTION

Figure 1:
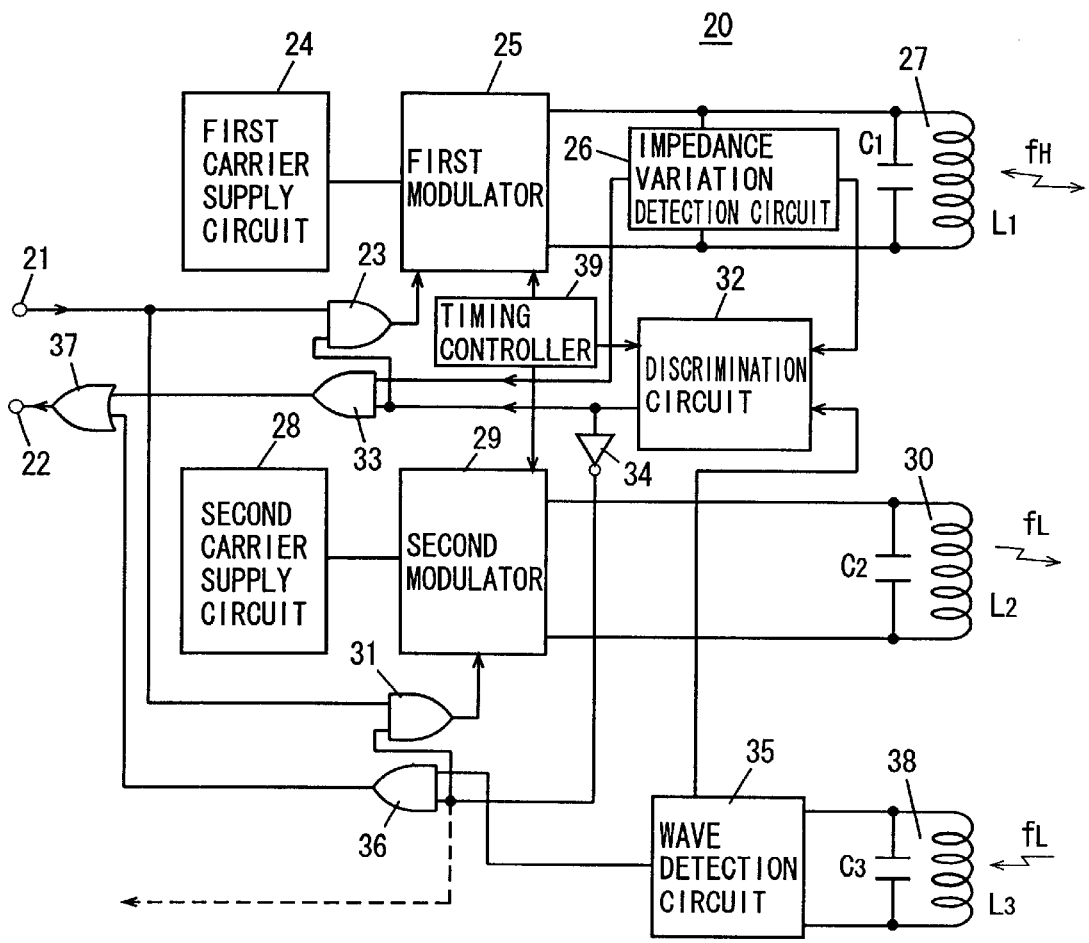
FIG. 1 is a block diagram showing a configuration of an interrogator according to a first embodiment of the present invention.

Hereinafter an interrogator according to the present invention and a non-contact communication system including the interrogator will now be described in detail with reference to the drawings. Note that same reference characters in the figures denote identical or corresponding portions.

First Embodiment

Figure 2:
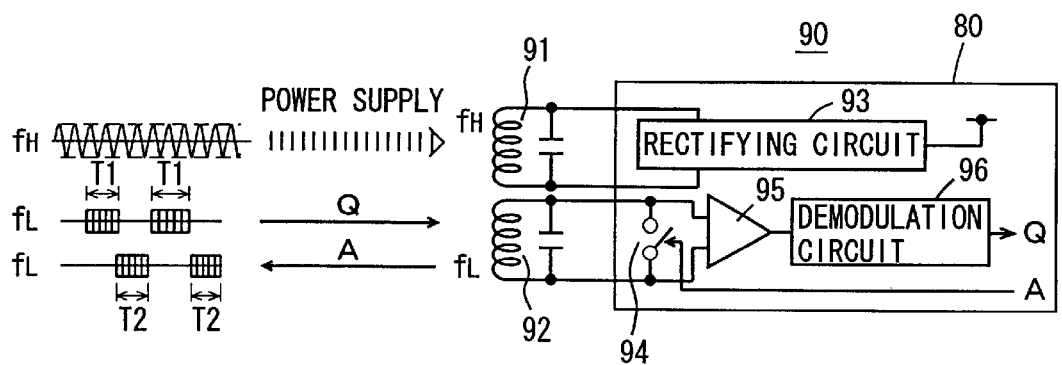
FIG. 2 shows a configuration of a responsor in a non-contact communication system in signal separation system.

FIG. 2 shows a configuration of a non-contact card (a responsor) of signal separation system, configuring a non-contact communication system according to a first embodiment of the present invention. As shown in FIG. 2, a non-contact card 90 of signal separation system includes a tuning circuit 91 receiving a first carrier of a frequency $f_H$ from an interrogator (not shown), a tuning circuit 92 receiving a second carrier of a frequency $f_L$ from the interrogator, and an integrated circuit (IC) portion 80. Tuning circuits 91, 92 each include a coil functioning as an antenna, and a capacitor. Integrated circuit portion 80 includes a rectifying circuit 93 rectifying a radio frequency (RF) signal (the first carrier) received by tuning circuit 91 to generate power, a switch 94 connected between ends of tuning circuit 92, a comparator 95 connected to tuning circuit 92, and a demodulation circuit 96 connected to comparator 95.

Information Q obtained through demodulation in demodulation circuit 96 is processed by an information processing circuit (not shown) and the information processing circuit outputs response information (response data) A. Response information A is a signal in the form of a train of pulses. In response to the signal, switch 94 changes over. Thus an impedance of tuning circuit 92 varies and response information A is transmitted to the interrogator via the second carrier of frequency $f_L$.

It should be noted that as shown in FIG. 2, information Q is transmitted from the interrogator to non-contact card 90 for a period T1 and response information A is transmitted from non-contact card 90 to the interrogator for a period T2. Periods T1 and T2 are alternately allotted in time and non-contact card 90 outputs response information A for period T2 in response to a command transmitted as one of information form the interrogator. Information Q and response information A are transmitted by modulating the second carrier of frequency $f_L$. The first carrier of frequency $f_H$ is normally transmitted from the interrogator to non-contact card 90, although it does not carry information.

Figure 3:
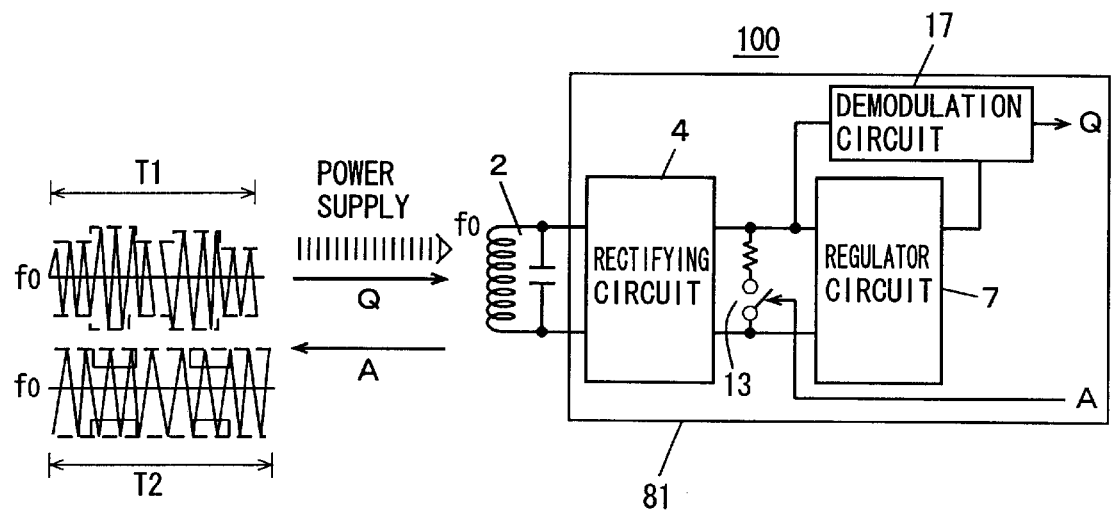
FIG. 3 shows a configuration of a responsor in a non-contact communication system in signal superimposition system.

FIG. 3 shows a configuration of a non-contact card (a responsor) of signal superimposition system. As shown in FIG. 3, a non-contact card 100 is provided with a tuning circuit 2 including a coil functioning as an antenna and a capacitor connected in parallel with the coil, and an integrated circuit 81 including a rectifying circuit 4 connected to tuning circuit 2, a switch 13, a regulator circuit 7 and a demodulation circuit 17.

Non-contact card 100 thus configured receives from an interrogator (not shown) for a period T1 a signal obtained by modulating a carrier of a frequency $f_0$ and for a period T2 a signal with a carrier of frequency $f_0$ non-modulated. In period T2, non-contact card 100 transmits response information A to the interrogator by modulating the carrier of frequency $f_0$ according to response information A. More specifically, response information A is a signal in the form of a train of pulses. In response to the signal, switch 13 changes over. The change-over of switch 13 varies an impedance of tuning circuit 2.

When the impedance of tuning circuit 2 serving as a load of the interrogator varies, the non-modulated carrier of frequency $f_0$ transmitted for period T2 is modulated according to response information A, as represented in FIG. 3.

Then the modulated carrier is demodulated in the interrogator and response information A is extracted. It should be noted that periods T1 and T2 in FIG. 3 are in fact allotted alternately in time.

FIG. 1 shows a configuration of an interrogator used in a non-contact communication system in accordance with the first embodiment of the present invention. As shown in FIG. 1, an interrogator 20 is provided with a data input terminal 21 receiving information to be transmitted, an AND gate 23 connected to data input terminal 21, and a first carrier supply circuit 24 configured e.g. by a sine wave oscillator and producing the first carrier of frequency $f_H$. It should be noted that the first carrier supply circuit 24 is not necessarily provided within interrogator 20 and may be provided in external, peripheral equipment.

Interrogator 20 is also provided with a first modulator 25 connected to the first carrier supply circuit 24 to modulate the first carrier of frequency $f_H$ according to interrogation data (the information to be transmitted) input to data input terminal 21 when AND gate 23 is active and to also output the first carrier that is not modulated when AND gate 23 is inactive, a first tuning circuit 27 including a coil L1 functioning as a transmitting and receiving antenna and a capacitor C1 connected between ends of coil L1 and tuning in to frequency $f_H$, an impedance variation detecting circuit 26 detecting impedance variation between ends of the first tuning circuit 27, and a second carrier supply circuit 28 configured e.g. by a sine wave oscillator and producing the second carrier of frequency $f_L$. It should be noted that the second carrier supply circuit 22 is not necessarily provided within interrogator 20 and may be provided in external, peripheral equipment.

Interrogator 20 is also provided with an AND gate 31 connected to data input terminal 21, a second modulator 29 connected to the second carrier supply circuit 28 to modulate the second carrier of frequency $f_L$ according to the information input to data input terminal 21 that is to be transmitted, a second tuning circuit 30 connected to the second modulator 29 and including a coil L2 functioning as an antenna and a capacitor C2, a third tuning circuit 38 including a coil L3 and a capacitor C3, a wave detection circuit 35 connected to the third tuning circuit 38 and receiving the second carrier having frequency $f_L$ to detect response information A, an AND gate 36 connected to wave detection circuit 35, a discrimination circuit 32 discriminating between signal superimposition system and signal separation system, and AND gate 33 connected to discrimination circuit 32, an inverter 34, an OR gate 37 connected to AND gates 33 and 36, and a data output terminal 22 connected to OR gate 37.

Interrogator 20 is also provided with a timing controller 39 connected to the first and second modulators 25 and 29 and discrimination circuit 32 to control a timing to activate them. Timing controller 39 previously stores information which determines a timing activating the first modulator 27 and the like.

It should be noted that coils L2 and L3 may cooperate with the antenna of coil L1 to configure a single antenna circuit or may configure a plurality of antenna circuits.

Although discrimination circuit 32 is initially set to discriminate one of signal superimposition system and signal separation system, the following describes an interrogator operation when discrimination circuit 32 is set to discriminate signal superimposition system.

In the operation, discrimination circuit 32 outputs a high-level signal and AND gate 23 is activated. Thus, information input via data input terminal 21 that is to be transmitted is supplied to the first modulator 25 and the first carrier is thus modulated according to the information to be transmitted and is radiated from coil L1.

The high-level signal output from discrimination circuit 32 is also inverted by inverter 34 and a low-level signal is thus input to AND gate 31. Thus, AND gate 31 is inactivated and the second modulator 29 does not receive the information to be transmitted. Consequently the second carrier having frequency $f_L$ is radiated from coil L2 without modulation. It should be noted that when discrimination circuit 32 determines that the system adopted by a non-contact card is signal superimposition system, a signal output from discrimination circuit 32 may control the second carrier supply circuit 28 or the second modulator 29 not to operate to prevent the second carrier non-modulated from being radiated from coil L2.

If the first carrier radiated from coil L1, as described above, is received by a non-contact card of the FIG. 3 signal superimposition system, the non-contact card 100 transmits response information A to interrogator 20 via the first carrier and an impedance of the first tuning circuit 27 of interrogator 20 varies. The variation in the impedance is detected by impedance variation detecting circuit 26 and a detection signal is supplied to discrimination circuit 32. It should be noted that the impedance variation may be detected by an oscillation circuit tuned to frequency $f_H$.

When discrimination circuit 32 receives the detection signal, discrimination circuit 32 determines that the system adopted by the non-contact card is signal superimposition system and discrimination circuit 32 continues to output a high-level signal. This state is referred to as a mode of signal superimposition system, and response information A detected at impedance variation detecting circuit 26 is supplied via AND gate 33 and OR gate 37 to data output terminal 22 and processed in a circuit (not shown) connected to data output terminal 22.

If a non-contact card is the FIG. 2 card adopting signal separation system rather than signal superimposition system, response information A is not supplied to interrogator 20 via the first carrier. Thus, discrimination circuit 32 determines that the system adopted by the card is signal separation system and discrimination circuit 32 outputs a low-level signal. Consequently, AND gate 23 is inactivated and the first modulator 25 does not receive the information input to the data input terminal that is to be transmitted. Thus the first carrier of frequency $f_H$ is radiated as an electronic wave from coil L1 without modulation. It should be noted that discrimination circuit 32 is provided e.g. with a timer and determines that the system adopted by the responsor is signal separation system when it fails to receive within a predetermined period of time a detection signal resulting from detection of the first carrier modulated.

When discrimination circuit 32 is outputting a low-level signal, AND gate 31 receives a high-level signal from inverter 34. Thus, AND gate 31 is activated and the information input to data input terminal 21 that is to be transmitted is thus supplied to the second modulator 29. Consequently, the second carrier having frequency $f_L$ is modulated according to the information to be transmitted and is thus radiated as an electronic wave from coil L2.

When non-contact card 90 transmits response information A to interrogator via the second carrier, the second carrier containing response information A is also induced at coil L3 and wave detection circuit 35 thus detects response information A and supplies a wave detection signal to discrimination circuit 32. In response to the wave detection signal supplied from wave detection circuit 35, discrimination circuit 32 continuously outputs a low-level signal. This state is referred to as a mode of signal separation system and response information A obtained at wave detection circuit 35 is supplied via AND gate 36 and OR gate 37 to data output terminal 22 and processed by a circuit (not shown) connected to data output terminal 22.

It should be noted that in the description provided above, it is in period T1 represented in FIGS. 2 and 3 that in the mode of signal superimposition system a modulation signal of the first carrier is radiated from the first tuning circuit 27 or in the mode of signal separation system a modulation signal of the second carrier is radiated from the second tuning circuit 30, and in period T2 the first or second carrier non-modulated is transmitted from the first or second tuning circuit 27 or 30, respectively. Period T2 is adapted to be a period in which non-contact cards (responsors) 90, 100 transmit response information A to interrogator 20.

The modulation and non-modulation periods T1 and T2 are alternately repeated. Switching between periods T1 and T2 depends on timing controller 39 controlling a timing of activation of the first modulator 25/the second modulator 29.

The frequencies $f_O$ and $f_H$ described above are both those of the first carrier and both adapted to be e.g. 13.56 MHz, whereas frequency $f_L$ of the second carrier is adapted to be e.g. 3.39 MHz. It should be noted, however, that frequencies $f_O$, $f_H$, $f_L$ are not limited to the values provided above and frequencies $f_O$ and $f_H$ may have different values, although it is desirable that frequencies $f_O$ and $f_H$ be same or approximate to each other in value.

It is also desirable that frequency $f_H$ (or $f_O$) of the first carrier and frequency $f_L$ of the second carrier be in a relation of 1/N, wherein 1 corresponds to one of the frequencies and N corresponds to the other of the frequencies and represents a natural number, since with such a relation, providing a single oscillator producing one of the carriers allows the other of the carriers to be produced by dividing an output signal of the oscillator by N in frequency so as to reduce manufacturing cost. When influences of harmonics are also considered, one of frequency $f_H$ of the first carrier and frequency $f_L$ of the second carrier may be M/N times the other of the frequencies, wherein M represents a natural number other than N.

It should be noted that while in the above description an interrogator is adapted to have a mode switched to automatically match a system of a non-contact card, it may have a mode switched through manual operation using a key or the like.

The periods T1 and T2 shown in FIGS. 2 and 3 may overlap in time, as conventional, or in response to a signal detected by wave detection circuit 35 a period other than a period for transmitting information to be transmitted may be provided as a response period to process signals.

Second Embodiment

Figure 4:
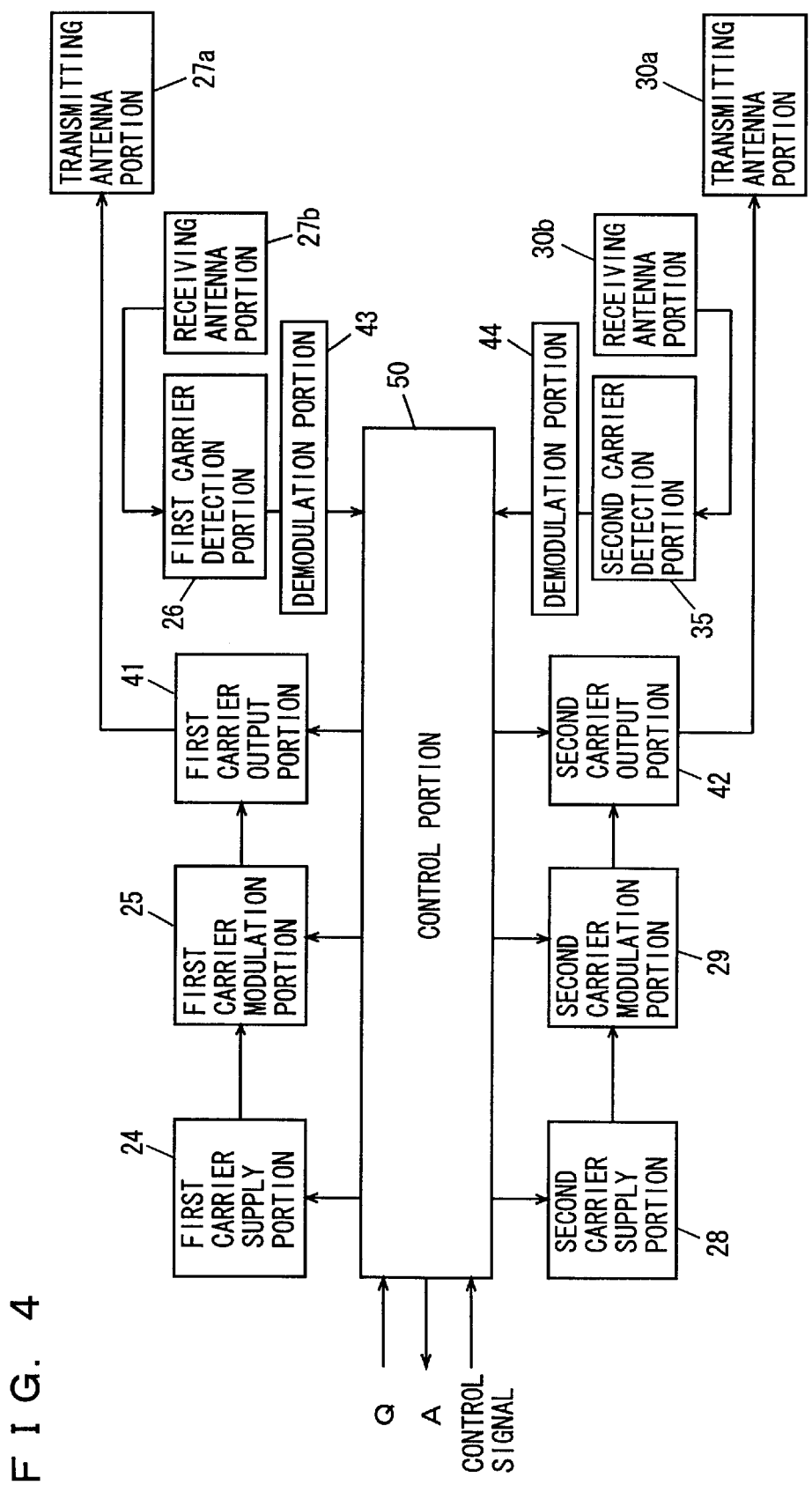
FIG. 4 is a block diagram showing a configuration of an interrogator according to a second embodiment of the present invention.

FIG. 4 is a block diagram showing a configuration of an interrogator used in a non-contact communication system according to a second embodiment of the present invention. As shown in FIG. 4, the interrogator is provided with a control portion 50 configured by a microcomputer or the like, a first carrier supply portion 24 producing a first carrier having a frequency $f_H$, a second carrier supply portion 28 producing a second carrier having a frequency $f_L$, a first carrier modulation portion 25 modulating the first carrier, a second carrier modulation portion 29 modulating the second carrier, a first carrier output portion 41 outputting the first carrier modulated by the first carrier modulation portion 25, a second carrier output portion 42 outputting the second carrier modulated by the second carrier modulation portion 29, a transmitting antenna portion 27a connected to the first carrier output portion 41, a transmitting antenna portion 30a connected to the second carrier output portion 42, a receiving antenna portion 27b receiving the first carrier modulated by a responsor, a receiving antenna portion 30b receiving the second carrier modulated by the responsor, a first carrier detection portion 26 connected to receiving antenna portion 27b, a second carrier detection portion 35 connected to receiving antenna portion 30b, a demodulation portion 43 connected to the first carrier detection portion 26 to demodulate the first carrier received from the responsor, and a demodulation portion 44 connected to the second carrier detection portion 35 to demodulate the second carrier received from the responsor.

To determine a system of a responsor in response to a signal supplied from demodulation portions 43, 44, control portion 50 is provided with the function of discrimination circuit 32 included in the interrogator according to the first embodiment. Control portion 50 also controls the first and second carrier supply portions 24 and 28, the first and second carrier modulation portions 25 and 29, and the first and second carrier output portions 41 and 42, as shown in FIG. 4.

An exemplary control portion 50 operation to identify a system adopted by a responsor will now be described with reference to the flow chart provided in FIG. 5.

Initially, when the identifying operation is initiated, at step S1 the second carrier output portion 42 is controlled to prohibit delivery of the second carrier having frequency $f_L$ and at step S5 the first carrier output portion 41 is controlled to deliver for a predetermined period of time the first carrier having frequency $f_H$ that is modulated. Then at step S10 the first carrier modulation portion 25 is controlled to provide a pause in the modulation of the first carrier and to continue to output the first carrier non-modulated. When response information A is transmitted from a responsor via the first carrier non-modulated, the first carrier detection portion 26 outputs a detection signal and determination is thus made at step S15 as to whether the first carrier modulated according to response information A is detected. When the first carrier detection portion 26 detects the first carrier modulated according to response information A, the process goes to step S20 and the responsor is identified as adopting signal superimposition system.

If at step S15 the first carrier detection portion 26 does not detect within the predetermined period of time the first carrier modulated by the responsor, the process goes to step S25 to output a signal with the second carrier modulated, while the first carrier non-modulated is continuously delivered. Thus a responsor adopting signal separation system rectifies the first carrier to obtain power and also extracts information Q from the second carrier modulated.

The interrogator also at step S30 controls the second carrier modulation portion 29 to provide a pause in the modulation of the second carrier and deliver the second carrier non-modulated. Then at step S35 determination is made as to whether the second carrier detection portion 35 detects the second carrier modulated by a responsor, and if so the process goes to step S40. At step S40 the first carrier modulation portion 25 is controlled to provide a pause in modulation of the first carrier, and at step S45 the responsor is identified as adopting signal separation system.

It should be noted that the process returns to step S1 when the second carrier detection portion 35 does not detect within a predetermined period of time the second carrier modulated by a responsor.

Figure 6:
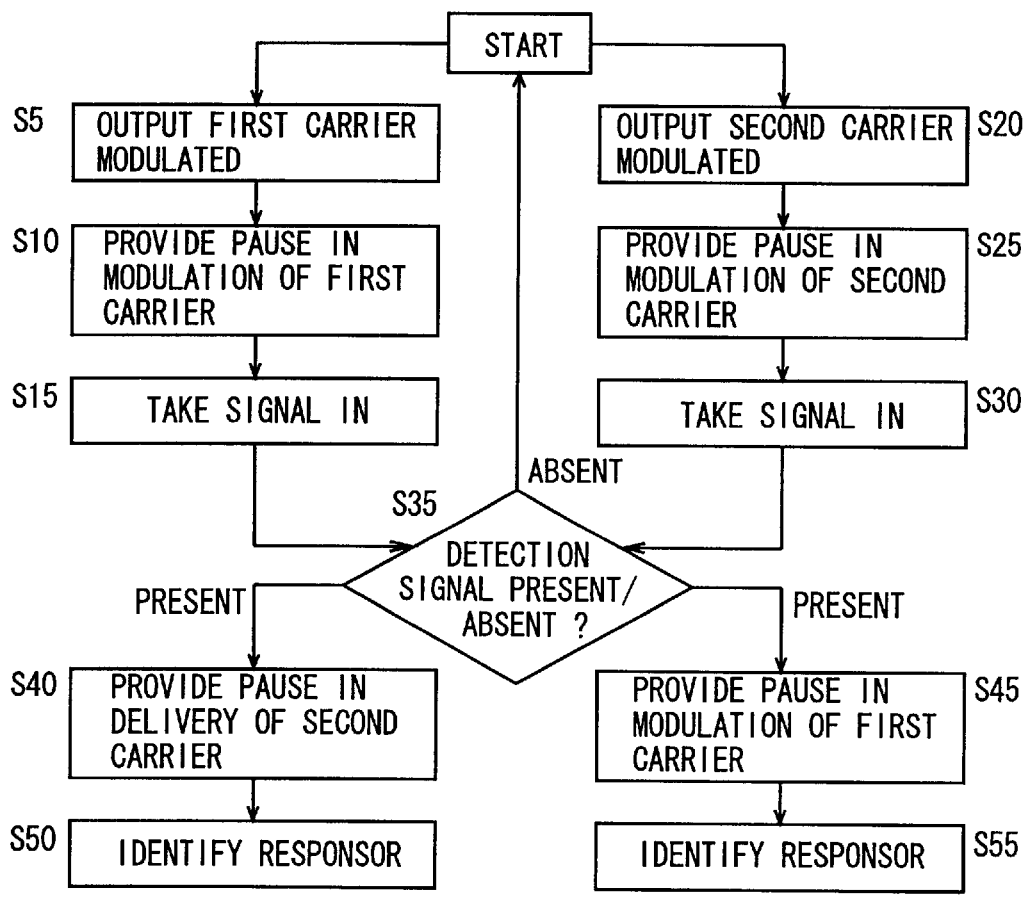
FIG. 6 is a flow chart representing another exemplary operation of the FIG. 4 interrogator.

Another example of control portion 50 operation to identify a system adopted by a responsor will now be described with reference to the flow chart provided in FIG. 6. As shown in FIG. 6, the operations from steps S5 to S15 and those from steps S20 to S30 are performed in parallel.

At step S5 the first carrier modulated is output, and at step S10 the first carrier modulation portion 25 is controlled to provide a pause in the modulation of the first carrier and output the first carrier non-modulated. Then at step S15 a signal output from demodulation portion 43 is taken into control portion 50.

Meanwhile, similarly at step S20 the first carrier modulated is output and at step S25 the second carrier modulation portion 29 is controlled to provide a pause in the modulation of the second carrier. Thus the second carrier non-modulated is output from transmitting antenna portion 30a. Then at step S30 a signal output from demodulation portion 44 is taken into control portion 50.

At step S35 the presence/absence of the detection signals taken in from demodulation portions 33 and 34 is determined. If the detection signal from demodulation portion 43 is only taken in, the process goes to step S40 to provide a pause in the delivery of the second carrier while the interrogator at step S50 identifies the responsor as adopting signal superimposition system.

If control portion 50 only takes in the detection signal from demodulation portion 44, the process goes to step S45 to control the first carrier modulation portion 25 to provide a pause in the modulation of the first carrier, while the interrogator at step S55 identifies the responsor as adopting signal separation system.

Figure 5:
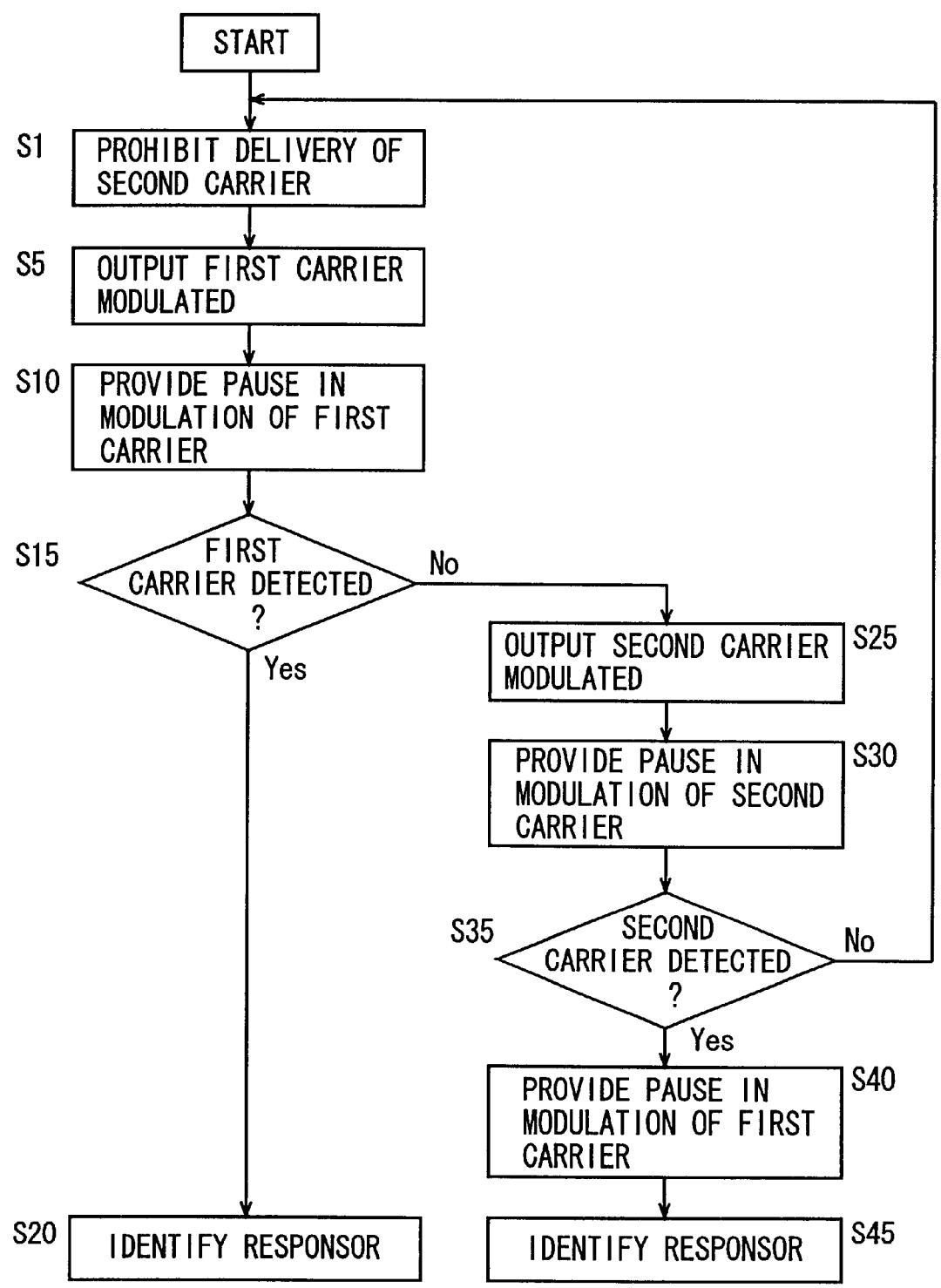
FIG. 5 is a flow chart representing an exemplary operation of the FIG. 4 interrogator.
Figure 7A:
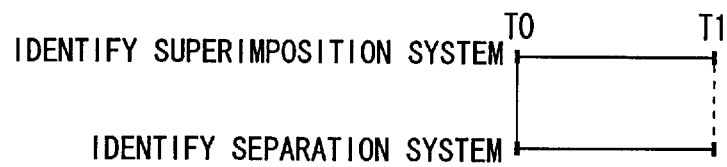
FIGS. 7A and 7B are a view for illustrating the exemplary operation represented in FIG. 6.
Figure 7B:
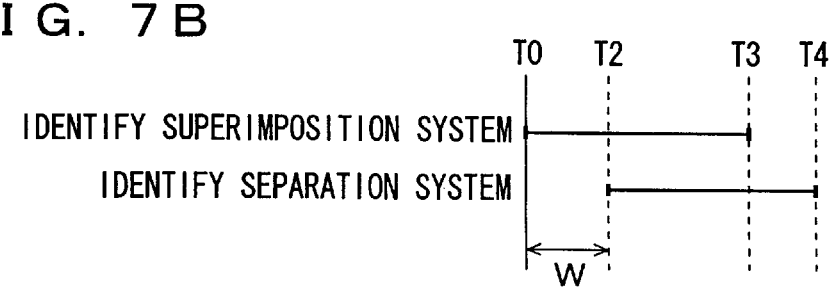

In the FIG. 5 operation, whether or not a system adopted by a responsor is signal superimposition system is initially determined and whether or not the system adopted by the responsor is signal separation system is then determined. If it has been initially determined that the system adopted by the responsor is signal superimposition system, the subsequent determination is not provided as to whether or not the system adopted by the responsor is signal separation system. By contrast, the FIG. 6 operation provides determination with respect to both of signal superimposition system and signal separation system. The determinations with respect to the both systems are provided in parallel, and may be provided simultaneously for a period T0 to T1, as shown in FIG. 7A, or may be provided offset in time such that the determination with respect to signal superimposition system is provided during a period T0 to T3 and the determination with respect to signal separation system is provided during a period T2 to T4, as shown in FIG. 7B.

Frequency fee of the first carrier and frequency $f_L$ of the second carrier are normally selected to be in a predetermined multiple relationship. Thus, when frequency $f_H$ of the first carrier is N times frequency $f_L$ of the second carrier, wherein N represents a natural number, a harmonic of a frequency $f_L$ multiplied by N can be input to the first carrier detection portion 26 and response information A from a responsor adopting signal separation system can be detected erroneously by the first carrier detection portion 26 so that control portion 50 can make an erroneous determination. The offset determination periods as shown FIG. 7B prevents erroneous determination at least during a period W (T0 to T2).

Third Embodiment

Figure 8:
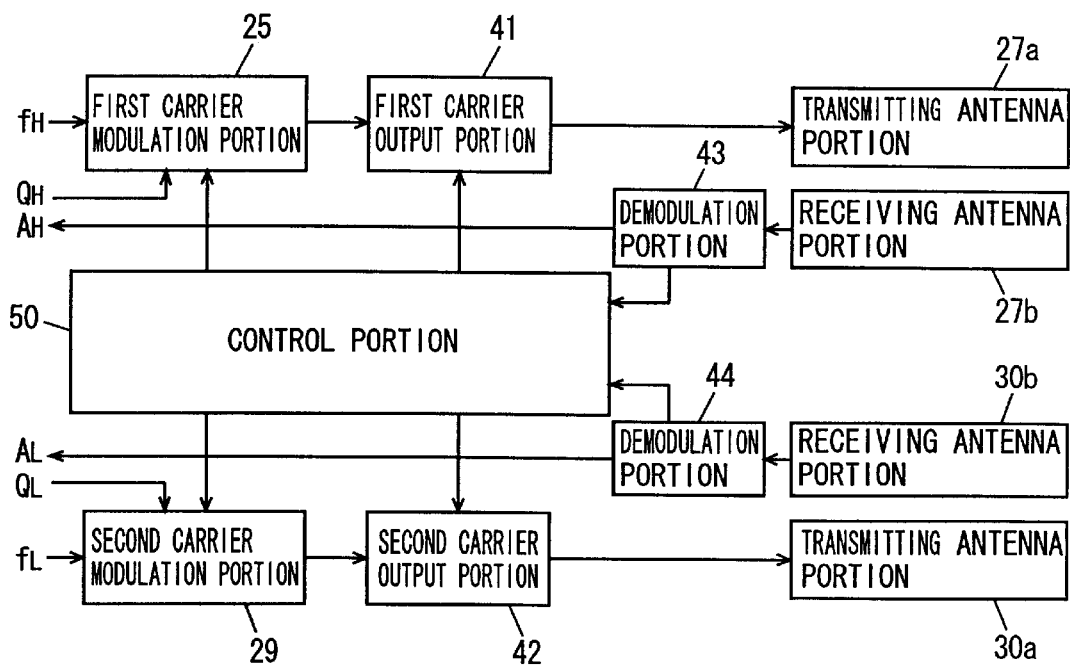
FIG. 8 is a block diagram showing a configuration of an interrogator according to a third embodiment of the present invention.

FIG. 8 is a block diagram showing a configuration of an interrogator used in a non-contact communication system according to a third embodiment of the present invention.

As shown in FIG. 8, the interrogator is similar in configuration to the FIG. 4 interrogator, although the FIG. 8 interrogator differs from the FIG. 4 interrogator that it is not provided with the first carrier supply portion 24, the second carrier supply portion 28, the first carrier detection portion 26 or the second carrier detection portion 35 and that information to be transmitted $Q_H$, $Q_L$ and response information $A_H$, $A_L$ are processed without passing through control portion 50.

It should be noted that modulation systems used in modulating a carrier depending on information (data) in the above embodiments can be various modulation systems, including any of amplitude modulation (ASK), phase modulation (PSK) and frequency modulation (FSK) or any combinations of at least two of the modulations. For signal separation system, however, when an interrogator modulates the first carrier in amplitude according to information Q and a responsor rectifies it and thus obtains power, it will have a voltage with large ripple. Accordingly, in applying an amplitude modulation system the degree of modulation is preferably not large, desirably no more than approximately 50%.

While for signal separation system the above embodiment uses the first carrier non-modulated of frequency $f_H$ for power supply, it may use the second carrier non-modulated of frequency $f_L$ for power supply. More specifically, for example when a communication of interrogations and responses completes in communication between an interrogator and a responsor the interrogator is stopped from transmitting the second carrier, and during the stop period the second carrier non-modulated of frequency $f_L$ can be transmitted to the responsor to allow the responsor to use the second carrier for power generation.

Furthermore, if a responsor adopting signal superimposition system is provided with an antenna circuit receiving the second carrier of frequency $f_L$ and connected to a rectifier, the second carrier can also be used to supply power.

It should also be noted that in the above embodiments the languages 'non-modulated,' 'a pause in modulation' and 'stopping (or providing a pause in) delivery' mean not only no modulation and no output but slight modulation and slight output.

While in the above embodiments period T1 for interrogation and period T2 for response have been described as being offset in time, periods T1 and T2 may coincide with each other completely, since a signal detection process to allow control portion 50 or the like to subtract transmitted information Q from detected information can be applied to obtain response information A.

Furthermore, transmitting antenna portions 27a, 30a for data transmission and receiving antenna portions 27b, 30b for data reception provided in the interrogators according to the second and third embodiments may be arbitrarily combined and thus used in common.

While the interrogators according to the above embodiments have an antenna portion formed of a tuning circuit including a coil and a capacitor, they may have an antenna portion formed e.g. of a patterned conductor incorporated in an integrated circuit.

Thus the interrogators according to the above embodiments allow interrogation data to be transmitted depending on the system adopted by a responsor. This can eliminate the necessity of providing an interrogator of a different system nearby and also eliminate difficulties in use due to mutual interference of signals.

What is claimed is:

1. An interrogator comprising:
    first transmission means (24, 25, 27) transmitting a first signal having a first frequency for supplying power and interrogation data to a responsor;
    second transmission means (24, 27–30) transmitting to said responsor a second signal having said first frequency for supplying power to said responsor and a third signal having a second frequency and modulated according to said interrogation data; and
    select means (26, 32, 35, 38, 50) selectively activating any one of said first and second transmission means according to response data transmitted from said responsor.

2. The interrogator according to claim 1, wherein said select means (26, 32, 35, 50) includes:
    first detection means (26) detecting said first signal modulated by said responsor according to said response data and transmitted; and
    second detection means (35) detecting said third signal modulated by said responsor according to said response data and transmitted.

3. The interrogator according to claim 2, further comprising:
    first demodulation means (43) demodulating a signal detected by said first detection means (26);
    second demodulation means (44) demodulating a signal detected by said second detection means (35); and
    response data generation means (50) generating said response data by subtracting said interrogation data from data demodulated by one of said first and second demodulation means.

4. The interrogator according to claim 2, wherein one of said first and second frequencies is M/N times the other of said first and second frequencies, M and N each representing a natural number.

5. The interrogator according to claim 1, wherein said select means (26, 32, 35, 50) allows said second transmission means (28, 30) to transmit said second signal when said select means (26, 32, 35, 50) selectively activates said first transmission means (24, 25, 27).

6. A non-contact communication system, comprising:
    an interrogator (20); and
    a responsor (90, 100) receiving an electronic wave transmitted from said interrogator to generate power and transmitting, to said interrogator, response data to data transmitted from said interrogator; wherein said interrogator (20) includes
    first transmission means (24, 25, 27) transmitting a first signal having a first frequency for supplying power and said data to said responsor,
    second transmission means (24, 27–30) transmitting a second signal having said first frequency for supplying power to said responsor and a third signal having a second frequency for supplying said data to said responsor, and
    select means (32, 50) selectively activating any one of said first and second transmission means according to said response data transmitted from said responsor.

* * * * *